(12) United States Patent
Roman (10) Patent No.: US 9,669,477 B2
(45) Date of Patent: Jun. 6, 2017

(54) DEVICE FOR CHIP REMOVING MACHINING

(71) Applicant: SANDVIK INTELLECTUAL PROPERTY AB, Sandviken (SE)

(72) Inventor: Stefan Roman, Valbo (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 321 days.

(21) Appl. No.: 14/172,955

(22) Filed: Feb. 5, 2014

(65) Prior Publication Data

US 2014/0219733 A1 Aug. 7, 2014

(30) Foreign Application Priority Data

Feb. 6, 2013 (SE) ...................................... 1350146

(51) Int. Cl.
*B23C 5/22* (2006.01)
*B23B 27/16* (2006.01)
*B23C 5/06* (2006.01)
*B23C 5/10* (2006.01)

(52) U.S. Cl.
CPC ................ *B23C 5/06* (2013.01); *B23C 5/109* (2013.01); *B23B 2205/12* (2013.01); *B23B 2205/16* (2013.01); *B23C 2210/166* (2013.01); *B23C 2210/168* (2013.01); *Y10T 407/192* (2015.01); *Y10T 407/2272* (2015.01)

(58) Field of Classification Search
CPC ..... B23C 2210/168; B23C 5/06; B23C 5/109; B23C 2210/166; B23B 2205/12; B23B 2205/16

See application file for complete search history.

(56) References Cited

U.S. PATENT DOCUMENTS

| | | | | |
|---|---|---|---|---|
| 2,623,272 A | * | 12/1952 | Greenleaf | ........... B23B 27/1666 407/79 |
| 3,466,721 A | * | 9/1969 | Binns | .................. B23B 27/1666 407/70 |
| 3,576,060 A | * | 4/1971 | Stein | ..................... B23B 27/002 407/117 |
| 4,202,650 A | | 5/1980 | Erickson | |
| 4,876,932 A | * | 10/1989 | Nessel | ................ B23B 27/1659 407/102 |
| 5,129,767 A | | 7/1992 | Satran et al. | |

(Continued)

FOREIGN PATENT DOCUMENTS

| | | | | |
|---|---|---|---|---|
| EP | | 0885678 B1 | 7/2004 | |
| WO | WO 2013065711 A1 | * | 5/2013 | ........... B23C 5/2247 |

*Primary Examiner* — Sara Addisu
(74) *Attorney, Agent, or Firm* — Corinne R. Gorski (57) ABSTRACT

A device for the chip removing machining of a work piece includes a body connectable to a holder or rotatable spindle. The body has at least one first seat to receive a cutting insert having a main cutting edge. The first seat has an active part including at least one first seat surface. The body receives the cutting insert in the first seat, the first seat including at least one location surface. The at least one location surface forms an angle with the first seat surface and positions the cutting insert axially and radially in the active part. The body has a second seat to receive a shim member such that the cutting insert adjoins the at least one first seat surface and the shim member. The cutting insert covers an area defined by the shim member and the at least one first seat surface.

14 Claims, 8 Drawing Sheets

(56) References Cited

U.S. PATENT DOCUMENTS

| | | | |
|---|---|---|---|
| 7,073,987 B2 | 7/2006 | Hecht | |
| 7,670,088 B2 * | 3/2010 | Andersson | B23C 5/2208 407/33 |
| 8,475,089 B2 * | 7/2013 | Kakai | B23C 5/109 407/103 |
| 2007/0248425 A1 * | 10/2007 | Andersson | B23C 5/06 407/113 |
| 2007/0256287 A1 * | 11/2007 | Kocherovsky | B23C 5/207 29/428 |
| 2010/0329800 A1 | 12/2010 | Edler et al. | |
| 2011/0081209 A1 | 4/2011 | Engstrom | |
| 2011/0129309 A1 | 6/2011 | Kovac et al. | |
| 2011/0135408 A1 * | 6/2011 | Saji | B23C 5/109 407/41 |
| 2011/0311326 A1 | 12/2011 | Pantzar | |
| 2013/0156516 A1 * | 6/2013 | Hecht | B23B 27/045 407/103 |
| 2013/0287506 A1 * | 10/2013 | Morgulis | B23B 27/065 407/103 |

* cited by examiner

DEVICE FOR CHIP REMOVING MACHINING

RELATED APPLICATION DATA

This application claims priority under 35 U.S.C. §119 to SE Patent Application No. 1350146-5, filed on Feb. 6, 2013, which the entirety thereof is incorporated herein by reference.

TECHNICAL FIELD

The present embodiments relate to a device for the chip removing machining of a workpiece, for instance a workpiece of titanium, steel, aluminium, castings, or another material. The device includes a body that is connectable to a holder or a rotatable spindle. The body defines a center axis and includes at least a first seat arranged to receive a cutting insert having at least one main cutting edge arranged to be active during chip removing machining. The first seat has an active part including at least one first seat surface, the body being arranged to receive the cutting insert in the first seat against the at least one first seat surface. The body has a second seat arranged to receive a shim member, and the body is arranged to receive the shim member in the second seat in such a way that the cutting insert being received in the first seat adjoins the at least one first seat surface and adjoins the shim member.

BACKGROUND OF THE INVENTION

A device, such as a cutting tool, for the rotary chip removing machining of a workpiece, for instance a workpiece of titanium, steel, aluminium, castings, or another material, generally comprises a body (also called basic body or tool body) and a number of cutting inserts, which often are mounted in seats, also called pockets or cutting seats, arranged in the tool body. The tool body defines a center axis, e.g. a rotation axis, and is usually connectable to a holder or a rotatable spindle. In drilling, the tool body is usually rotated by the rotation of a spindle or holder, which holds the tool body, at the same time as the workpiece is kept immovable. In milling, the tool body is usually rotated by the rotation of the spindle or the holder, which holds the tool body, at the same time as the workpiece is kept immovable or is fed in a feeding direction. In contour milling, the tool body can be rotated in a direction of rotation on its center axis at the same time as the workpiece is fed in relation to the tool body in a feeding direction. In turning, the workpiece is usually rotated while the tool body is kept immovable by a holder. In prior art, often also shim plates are used mounted between the cutting insert and tool body to protect the tool body when the cutting insert mounted to the tool body machines a workpiece. The respective cutting insert is mounted in its seat with the shim plate placed between the cutting insert and the seat surface of the seat against which the cutting insert is received and held. If the stresses become too large on the cutting insert during machining, it is the shim plate that absorbs said stresses and that primarily becomes damaged instead of the tool body, whereby the tool body is protected against damage and the wear on the tool body decreases. The damaged shim plate can easily be exchanged and a replacement of the entire tool body is avoided.

SUMMARY OF THE INVENTION

In certain cases there may be problems with shim plates according to prior art, e.g. for smaller tools or for tools the body of which is provided with many cutting inserts in the direction of rotation and/or in the axial direction, whereby the shim plates may be relatively bulky and constitute a limitation for the tool. Smaller tools, having a body with a small diameter, have lack of space in the center part of the body for shim plates. Moreover, shim plates may be relatively bulky for tools having a body provided with many cutting inserts in the direction of rotation and accordingly have small distances between the cutting inserts (high tooth density) in the direction of rotation.

Thus, one aspect of the present embodiment is to provide an improved cutting tool for the chip removing machining of a workpiece, for instance a workpiece of titanium, steel, aluminium, castings, or another material.

Another aspect is to provide an improved cutting tool wherein the body of the cutting tool is protected against stresses when the cutting insert/inserts mounted to the body machines/machine a workpiece.

The above mentioned aspects are achieved by providing a device for the chip removing machining of a workpiece, the device including a body that is connectable to a holder or a rotatable spindle. The body defines a center axis and has at least one first seat arranged to receive a cutting insert having at least one main cutting edge arranged to be active during chip removing machining, the first seat comprising an active part. The active part comprises at least one first seat surface. The body is arranged to receive the cutting insert in the first seat against the at least one first seat surface. The first seat includes at least one location surface. The at least one location surface forms an angle with the first seat surface and is arranged to position the cutting insert axially and radially in the active part of the first seat. The body is arranged to receive the cutting insert in the first seat in such a way that said active part extends along the active main cutting edge or along a portion thereof. The body includes a second seat arranged to receive a shim member. The body is arranged to receive the shim member in the second seat in such a way that the cutting insert being received in the first seat adjoins the at least one first seat surface and adjoins the shim member. Said active part is delimited axially in at least one direction and radially inward, in relation to the center axis, by the at least one location surface. The body is arranged to receive the cutting insert in the first seat in such a way that the cutting insert, as seen perpendicular to the plane of the at least one first seat surface, covers an area that is defined by the shim member and by the at least one first seat surface of said active part. The second seat is arranged to receive a shim member that occupies less than 90% of said area.

The strength of a tool body may decrease if too much space in the tool body is occupied for shim plates. A shim plate, or a shim member, that is situated under the cutting insert in the entire active part of a seat is unnecessary large, because the probability of insert fracture is greatest at the active part of the cutting insert that is farthest away from the holder or the rotatable spindle. The shim member according to the present embodiment becomes less bulky in the body and it is avoided that the strength of the body is deteriorated. Thus, the shim member does not have to occupy the space of the first seat (the seat of the cutting insert) closest to the center of the body by means of the innovative body of the device. The shim member may be given a longer tangential extension, i.e., a longer extension in the direction of rotation on the body, such as in extra vulnerable regions of the active part of the first seat, without unnecessary much space of the body being occupied and without the strength of the body being deteriorated, i.e., the strength of the body can be maintained. The service life of the body is improved since damage to the body is avoided. Accordingly, the respective first seat can receive a cutting insert that, as seen in the direction from the active main cutting edge toward the center axis of the body, has support in the bottom on one hand against the shim member and on the other hand against the at least one first seat surface of the active part, i.e., the body.

A shim plate, or a shim member, that is situated under the entire length of the active/working main cutting edge in certain cases is unnecessary large, the probability of insert fracture is the greatest at the part of the active main cutting edge that is axially and radially outermost, since, e.g., that part of the active main cutting edge always is in engagement, for instance in a face milling operation, at varying cutting depths. The respective first seat can receive a cutting insert that along its active main cutting edge has support in the bottom against on one hand the at least one first seat surface of the active part, i.e., the body, and on the other hand against the shim member. The shim member does not have to occupy the space of the first seat (the seat of the cutting insert) along the entire length of the active/working main cutting edge. In certain embodiments, the shim plate may, however, be allowed to be situated under the entire length of the active/working main cutting edge. The second seat may be given an axial extension that is shorter than the axial extension of the active part of the first seat, whereby the shim member occupies less space of the body and a more robust, high strength cutting tool provided with a shim member is achieved. A separate seat for the receipt of the shim member may also be advantageous in the manufacture of the body of the device, among other things, the second seat may be arranged by a radially extending recess in the body, with a radially extending recess being uncomplicated to form in the body.

Accordingly, an improved cutting tool for chip removing machining is provided. An improvement is provided in particular for cutting tools having small body diameters, where there is lack of space, or for cutting tools having high tooth density in the direction of rotation, where the body of the cutting tool still can be protected against stresses by shim members when the cutting insert/inserts mounted to the body machines/machine a workpiece.

The respective cutting insert and the respective first seat may adjoin an essentially axially extending chute of the body, the chute serving as a chip channel in the area upstream of the cutting insert and the first seat, respectively.

The at least one first seat surface may comprise one or a plurality of first seat surfaces. The respective first seat surface of said plurality of first seat surfaces may be essentially point shaped or be a relatively small surface. The second seat may adjoin the first seat. The body may advantageously be rotatable on its center axis and accordingly be arranged to rotate on its center axis in the chip removing machining. The at least one location surface may be a location surface or a plurality of location surfaces.

Said area may at least have an extension along the active main cutting edge or along a portion thereof, wherein the body may be arranged to receive the cutting insert in the first seat and receive the shim member in the second seat in such a way that the shim member at least obtains an extension along a portion of the active main cutting edge, wherein the extension of the shim member along said portion of the active main cutting edge may be less than the extension of said area along the active main cutting edge or along a portion thereof.

According to an advantageous embodiment, the second seat is arranged to receive a shim member that occupies less than 80% of said area, e.g. less than 70% or 60% or 50% or 40% or 25% of said area. By means of these embodiments, the shim member is given an advantageous shape that is not bulky in the body but which simultaneously gives an efficient protection of the body in the tangential direction, whereby the service life of the body is improved since damage to the body is avoided. Thus, by means of these embodiments, an improved cutting tool is provided.

According to another advantageous embodiment of the device, the body includes a first end portion and an opposite second end portion, the body at the first end portion being connectable to the spindle or the holder and at the second end portion being provided with the first and second seat, the active part of the first seat having a first region situated farthest away from the first end portion of the body in relation to the remaining part of the active part of the first seat, and the second seat adjoining said first region. Said first region is the region of the active part of the first seat that is subjected to the greatest stresses when the cutting insert mounted in the seat machines a workpiece. By placing the second seat adjacent to said first region, the shim member situated in the second seat protects the most vulnerable region on the body or in the active part of the first seat. By means of this embodiment, an improved cutting tool is provided wherein the body of the cutting tool is efficiently protected against stresses when the cutting insert machines a workpiece, without the shim member being too bulky and accordingly without the strength of the body being deteriorated. By this embodiment, the service life of the body is further improved.

According to another advantageous embodiment of the device, the body includes a first end portion and an opposite second end portion, the body at the first end portion being connectable to the spindle or the holder and at the second end portion being provided with the first and second seat, the at least one first seat surface having a first region situated farthest away from the first end portion of the body in relation to the remaining part or portion of the at least one first seat surface, the second seat adjoining the first region of the at least one first seat surface. By placing the second seat adjoining the first region of the at least one first seat surface, the shim member situated in the second seat protects the most vulnerable region on the body or on the at least one first seat surface. By means of this embodiment, an improved cutting tool is provided wherein the body of the cutting tool is efficiently protected against stresses when the cutting insert machines a workpiece, without the shim member being too bulky and accordingly without the strength of the body being deteriorated. By this embodiment, the service life of the body is further improved.

According to a further advantageous embodiment of the device, the body is arranged to receive the shim member in the second seat in such a way that at least a portion of the shim member is situated farthest away from the first end portion of the body in relation to the at least one first seat surface. By means of this embodiment, the shim member situated in the second seat protects the most vulnerable region on the body. By means of this embodiment, an improved cutting tool is provided wherein the body of the cutting tool is efficiently protected against stresses when the cutting insert machines a workpiece, without the shim member being too bulky and accordingly without the strength of the body being deteriorated.

According to another advantageous embodiment of the device, the at least one first seat surface is located in an essentially axial plane that extends essentially radially in relation to the center axis of the body. An axial plane is a plane that is parallel to the center axis of the body or is a plane in which the center axis of the body is located. An axial plane that extends radially in relation to the center axis of the body extends in the radial direction toward the center axis of the body. A radial plane is instead a plane that is perpendicular to the center axis of the body. The at least one first seat surface may comprise one or a plurality of first seat surfaces that are located in the same plane. The at least one first seat surface may have an essentially axial extension and extends essentially radially in relation to the center axis of the body. The at least one first seat surface may comprise a continuous seat surface.

According to yet another advantageous embodiment of the device, in the second seat, the body is arranged to receive a shim member comprising at least one contact surface, the body being arranged to receive the shim member in the second seat in such a way that the cutting insert being received in the first seat adjoins the at least one first seat surface and adjoins the at least one contact surface, the at least one contact surface being smaller than said area. By means of this embodiment, a further improved cutting tool for chip removing machining is provided. The at least one contact surface may comprise one or a plurality of contact surfaces. The respective contact surface may be essentially point shaped or be a relatively small surface.

According to an advantageous embodiment of the device, the body is arranged to receive the shim member in the second seat in such a way that the at least one contact surface is located in an essentially axial plane that extends essentially radially in relation to the center axis of the body. By means of this embodiment, a further improved cutting tool for chip removing machining is provided, and the cutting insert is afforded an advantageous and stable position in its seat. The at least one contact surface may comprise one or a plurality of contact surfaces that are located in the same plane.

According to a further advantageous embodiment of the device, the body is arranged to receive the shim member in the second seat in such a way that the at least one contact surface has an essentially axial extension and extends essentially radially in relation to the center axis of the body. The at least one contact surface may comprise a continuous contact surface.

According to another advantageous embodiment of the device, the body is arranged to receive the shim member in the second seat in such a way that the at least one contact surface and the at least one first seat surface essentially are located in the same plane. By means of this embodiment, a further improved cutting tool for chip removing machining is provided, and the cutting insert is afforded an advantageous and stable position in its seat.

According to yet another advantageous embodiment of the device, the device comprises first mounting members for the mounting of the cutting insert, the device comprising second mounting members separated from said first mounting members and arranged for the mounting of the shim member, wherein said first mounting members comprise a first recess arranged in the body and situated at the first seat and that is arranged to receive and hold a first fastening element, said second mounting members comprising a second recess arranged in the body and situated at the second seat and that is arranged to receive and hold a second fastening element, wherein the first recess defines a first center axis and the second recess defines a second center axis, the first and second recess being arranged in the body in such a way that the second center axis is aligned with or parallel to an axis that forms a first angle with the first center axis. By means of two such separated recesses, the respective fastening element can be made shorter in relation to fastening elements that should engage one and the same recess for the mounting of both the cutting insert and the shim plate. A shorter fastening element makes the attachment of the cutting insert and shim member less susceptible to tolerances. By means of two such angled recesses, the mounting can be facilitated since the respective fastening element engages the respective recess in different directions. The respective mounting members may also be defined as mounting equipment. The respective recess may be threaded. The respective fastening element may be threaded. Alternatively, the respective fastening element may be wedge-shaped or cone-shaped and the respective recess may in addition be complementary, i.e., e.g. cone-shaped. Other mounting members are, however, possible, such as different types of clamping or tightening members/equipment. By means of this embodiment, an improved cutting tool is provided.

According to a further advantageous embodiment of the device, the first angle is essentially perpendicular. By means of two such separated recesses, the mounting can be facilitated since the respective fastening element engages the respective recess in two directions being essentially perpendicular in relation to each other. By means of this embodiment, an improved cutting tool is provided.

According to another advantageous embodiment of the device, the second recess is arranged in the body in such a way that the second center axis extends essentially radially in relation to the center axis of the body. By means of this embodiment, the shim member can be fastened using a short fastening element at the same time as the shim member can have a long extension in the tangential direction, which provides more shim member material behind or after the cutting insert in relation to the direction of rotation for the body, which further improves the protection of the body against damage. By means of this embodiment, an improved cutting tool is provided.

According to yet another advantageous embodiment of the device, the second recess is arranged in the body in such a way that the second center axis extends essentially axially in relation to the center axis of the body. By means of this embodiment, the mounting of the shim member can be facilitated for certain variants of the device. Also by means of this embodiment, the shim member can be fastened using a short fastening element at the same time as the shim member can have a long extension in the tangential direction, which provides more shim member material behind or after the cutting insert in relation to the direction of rotation for the body, which further improves the protection of the body against damage. A fastening element can easily engage the second recess where the second seat, e.g., is arranged in the end of the body, i.e., when the second seat opens toward one end of the body. By means of this embodiment, an improved cutting tool is provided.

According to an advantageous embodiment of the device, in the second seat, the body is arranged to receive a shim member that has a tangential extension in the tangential direction in relation to the center axis of the body and a radial extension in the radial direction in relation to the center axis of the body, the length of the tangential extension of the shim member exceeding the length of the radial extension of the shim member. By means of this embodiment, the shim member is given an advantageous shape that is not bulky in the body and in particular does not need to occupy space at the center of the body, but which simultaneously gives an efficient protection of the body in the tangential direction, whereby the service life of the body is improved since damage to the body is avoided. Thus, by means of this embodiment, an improved cutting tool is provided.

According to yet another advantageous embodiment of the device, the device comprises the shim member received in the second seat. The respective shim member may be detachably mounted to the body in the second seat.

According to an advantageous embodiment of the, the device comprises the cutting insert received in the first seat. The respective cutting insert may be detachably mounted to the body in the first seat.

According to a further advantageous embodiment of the device, the shim member is manufactured from a first material composition and the body is manufactured from a second material composition, which differs from the first material composition.

According to another advantageous embodiment of the device, the shim member is manufactured from a first material composition and the cutting insert is manufactured from a third material composition, which differs from the first material composition.

The present embodiments are also applicable to independent cutting tools, wherein the cutting tool includes detachable insets provided with cutting edges and that are connected to a body or tool body, i.e., that the body may comprise a detachable body part having cutting inserts that are connectable to the body, or that the body is connected to another unit or holder that in turn is connected to a spindle, which may be rotatable.

The device according to the present embodiment is in particular advantageous and efficient for workpieces of metal or metal compositions, such as titanium, steel, aluminium, and castings. The device may, however, be used for other materials.

The above mentioned features and embodiments of the device according to the present embodiments may be combined in many different possible ways and thereby provide further advantageous embodiments.

Further advantageous embodiments of the device according to the present invention and other advantages of the present disclosure are seen in the detailed description of embodiments.

BRIEF DESCRIPTION OF THE DRAWINGS

The present invention will now, for exemplifying purposes, be described more thoroughly by means of embodiments and with reference to the accompanying drawings, in which.

DETAILED DESCRIPTION OF EMBODIMENTS

FIGS. 1-8 schematically show a first embodiment of the device for the chip removing machining, such as rotary chip removing machining, of a workpiece, for instance titanium, steel, aluminium, castings, or another material. According to the first embodiment, the device may be in the form of a tool, more precisely a milling cutter. The device includes a body 102, which defines a center axis z-z. The center axis z-z of the body may also be a rotation axis. The body 102 may be rotatable on its center axis z-z. The body 102 is connectable to a holder or a rotatable spindle (not shown). The body 102 may be connectable to a holder or a rotatable spindle in ways known to a person skilled in the art. The spindle may be rotatably mounted on the stationary part of the device, and thereby the body 102 may be rotatable with the spindle. The body 102 includes a first end portion 104 and an opposite second end portion 106, wherein the body 102 at the first end portion 104 may be connectable to the spindle or the holder. The center axis z-z of the body 102 may extend through the first and second end portion 104, 106.

The body 102 includes at least one first seat 108 or a plurality of first seats 108, e.g. two first seats 108 as shown in FIGS. 1-6. The body 102 can include only one first seat or more than two seats. The respective first seat 108 is arranged to receive a cutting insert 112 having at least one main cutting edge 115 arranged to be active during chip removing machining. The main cutting edge 115 that is active during machining is the main cutting edge 115 that machines the workpiece. At the second end portion 106, the body 102 is provided with the at least one first seat 108.

Figure 1:
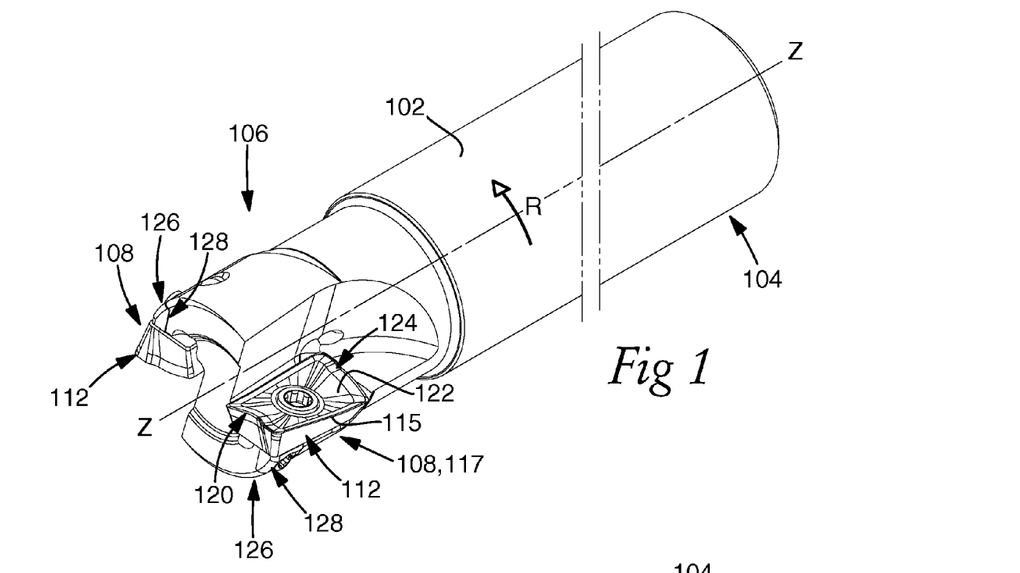
FIG. 1 is a schematic perspective view of a first embodiment of the device.
Figure 2:
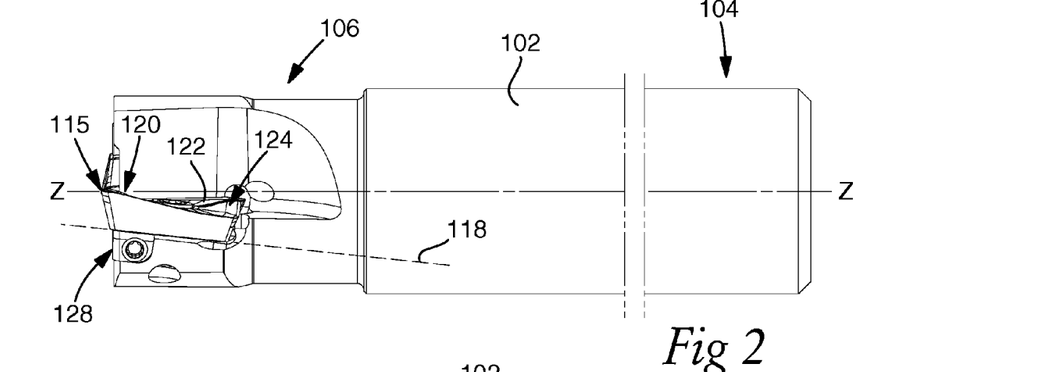
FIG. 2 is a schematic side view of the device in FIG. 1.
Figure 3:
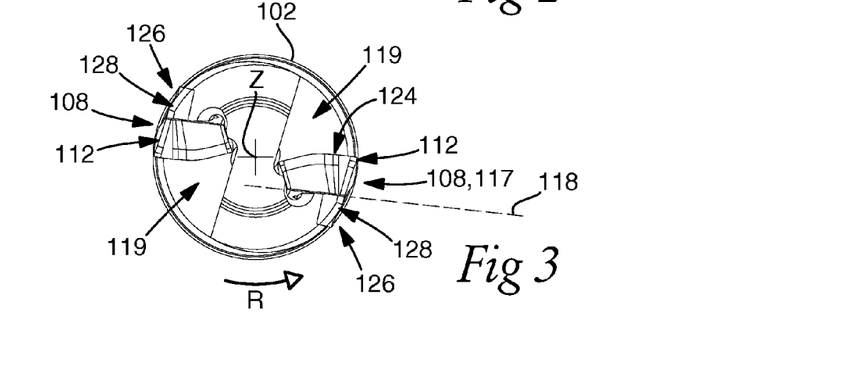
FIG. 3 is a schematic top view of the device in FIG. 1.
Figures 4, 5, 6:
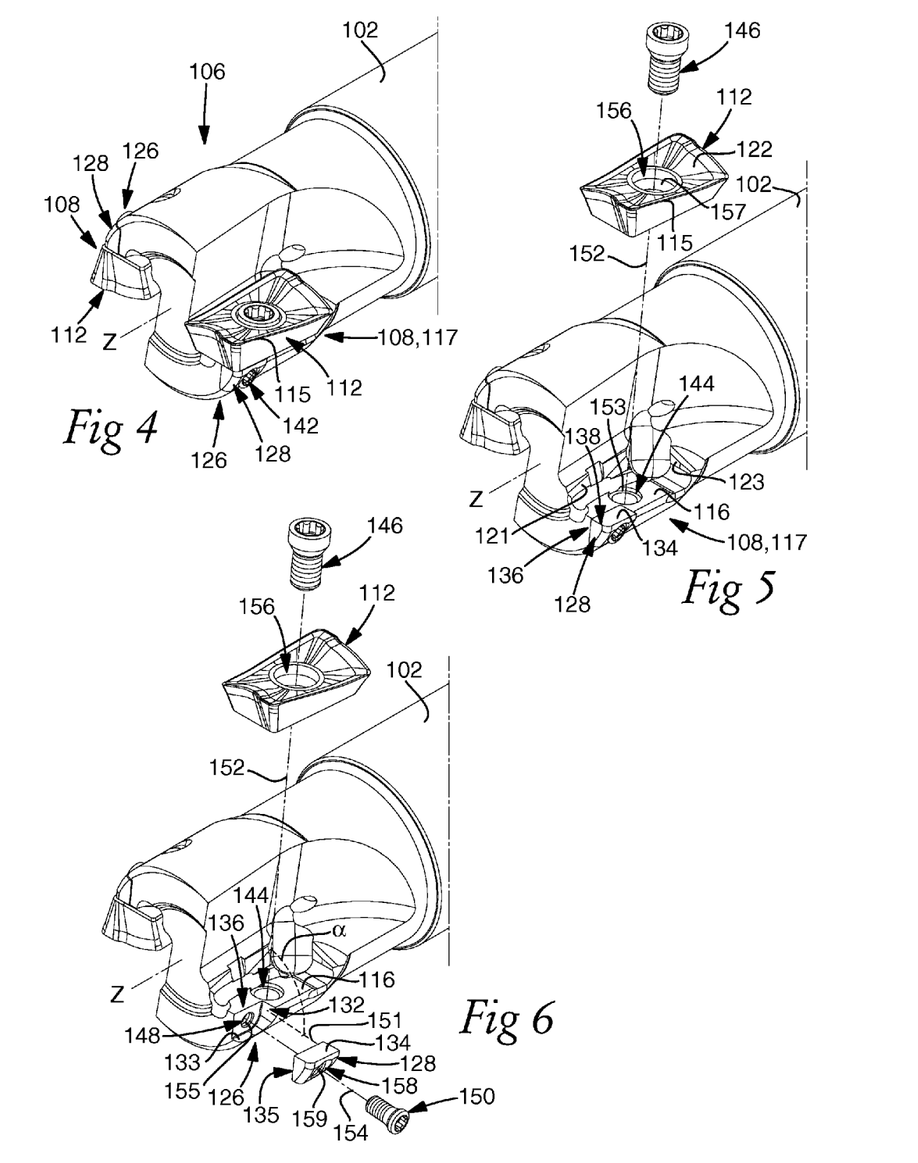
FIG. 4 is an enlarged view of a part of the device in FIG. 1.
FIG. 5 shows the part of the device in FIG. 4, wherein the cutting insert has been removed from its seat.
FIG. 6 shows the part of the device in FIG. 4, wherein both the cutting insert and the shim member have been removed from their seats.

With reference to FIGS. 5-6, the respective first seat 108 includes an active part 117. The active part 117 may also be referred to as an operative part of the first seat. The active part 117 comprises in turn at least one first seat surface 116, which may be located in an essentially axial plane 118 that extends essentially radially in relation to the center axis z-z of the body 102 (see FIGS. 2 and 3 for the plane 118). In the active part 117 of the first seat 108, the body 102 is arranged to receive at least the part of the cutting insert 112 that includes the active main cutting edge 115. The body 102 is arranged to receive the cutting insert 112 in the first seat 108 against the at least one first seat surface 116. The body 102 is arranged to receive the cutting insert 112 in the first seat 108 in such a way that said active part 117 extends along the active main cutting edge 115 or along a portion thereof. The respective cutting insert 112 and the respective first seat 108 may adjoin an essentially axially extending chute 119 of the body 102, the respective chute 119 serving as a chip channel upstream of the cutting insert 112 and upstream of the first seat 108, respectively. The respective first seat 108 may open axially in the direction away from the first end portion 104 of the body 102 in relation to the center axis z-z of the body. The respective first seat 108 may open radially outward from the body 102 in relation to the center axis z-z of the body 102.

With reference to FIG. 5, the first seat 108 includes at least one location surface 121, 123 arranged to position the cutting insert 112 axially and radially, in relation to the center axis z-z of the body 102, in the active part 117 of the first seat 108. The location surface 121, 123 may also be called support surface. The at least one location surface 121, 123 forms an angle with the first seat surface 116. The at least one location surface 121, 123 has at least one axially extending location surface 121 and at least one radially extending location surface 123. The active part 117 of the first seat 108 is delimited axially in at least one direction and radially inward, in relation to the center axis z-z of the body 102, by the at least one location surface 121, 123. In the embodiment in FIG. 5, the active part 117 of the first seat 108 is delimited axially in one direction, e.g. in the axial direction toward the first end portion 104 of the body 102, by a radially extending location surface 123. In the embodiment in FIG. 5, the active part 117 of the first seat 108 is delimited radially inward, i.e., in the radial direction toward the center axis z-z of the body 102, by an axially extending location surface 121. The body 102 may, in relation to a workpiece, be arranged to rotate in a direction of rotation R, also called direction of operational rotation, on its center axis z-z for the cutting insert 112 to machine the workpiece.

Because the at least one first seat surface 116 is located in an essentially axial plane, the plane of the at least one first seat surface 116 may deviate from a strictly axial plane, e.g. in order to arrange mounted cutting inserts with a negative or positive axial rake angle. A positive axial rake angle means that the lower part 120 of the chip surface 122 of the cutting insert 112, i.e., the part 120 of the chip surface 122 that is closest to the termination of the second end portion 106 of the body 102, is located before the upper part 124 of the chip surface 122 of the cutting insert 112, i.e., the part of the chip surface 122 that is closest to the first end portion 104 of the body 102, in the direction of operational rotation R of the body 102. Alternatively expressed, the cutting insert 112 leans backward/upward as viewed in side view and in relation to the direction of operational rotation R of the body 102.

The cutting insert in FIGS. 1-7 has a positive axial rake angle (see FIG. 2), but could instead have a negative axial rake angle or lack axial rake angle. A negative axial rake angle consequently means that the lower part of the chip surface of the cutting insert is located after the upper part of the chip surface of the cutting insert in the direction of operational rotation of the body. Because the at least one first seat surface 116 is located in an essentially axial plane 118 that extends essentially radially in relation to the center axis z-z of the body 102 the plane 118 of the at least one first seat surface 116 may deviate from an essentially axial plane that extends in a strictly radial direction, e.g. for arranging the chip surface 122 of mounted cutting inserts 112 in an axial plane that extends radially or for arranging mounted cutting inserts with a positive or negative radial rake angle. The cutting insert in FIGS. 1-7 has a positive radial rake angle, but could instead have a negative radial rake angle or lack radial rake angle. An essentially axial plane that extends essentially radially in relation to the center axis of the body excludes a tangential plane and excludes a radial plane.

The body 102 includes a second seat 126 arranged to receive a shim member 128. At the second end portion 106, the body 102 may be provided with the second seat 128. The body 102 has a second seat 126 for each first seat 108. The body 102 is arranged to receive the shim member 128 in the second seat 126 in such a way that the cutting insert 112 being received in the first seat 108 adjoins the at least one first seat surface 116 and adjoins the shim member 128. The at least one first seat surface 116 has an essentially axial extension and extends essentially radially in relation to the center axis z-z of the body 102. The second seat 126 may adjoin the first seat 108. The second seat 126 has a pocket 132 arranged in the body 102 and arranged to receive the shim member 128. The second seat 126 has at least one second seat surface 133, wherein the body 102 may be arranged to receive the shim member 128 in the second seat 126 against the at least one second seat surface 133. In the second seat 126, the body 102 may be arranged to receive a shim member 128 having at least one contact surface 134.

The body 102 may be arranged to receive the shim member 128 in the second seat 126 in such a way that the cutting insert 112 being received in the first seat 108 adjoins the at least one first seat surface 116 and adjoins the at least one contact surface 134. In the second seat 126, the body 102 may be arranged to receive a shim member 128 comprising a main part 135. The shape of the second seat 126 and the shape of the main part 135 of the shim member 128 may advantageously be complementary in relation to each other. The body 102 may be arranged to receive the shim member 128 in the second seat 126 in such a way that the at least one contact surface 134 is located in an essentially axial plane 118 that extends essentially radially in relation to the center axis z-z of the body 102.

The body 102 may be arranged to receive the shim member 128 in the second seat 126 in such a way that the at least one contact surface 134 has an essentially axial extension and extends essentially radially in relation to the center axis z-z of the body 102. The body 102 may be arranged to receive the shim member 128 in the second seat 126 in such a way that the at least one contact surface 134 and the at least one first seat surface 116 essentially are located in the same plane 118. If the at least one contact surface 134 is located in an essentially axial plane 118 that extends essentially radially and the at least one first seat surface 116 is located in an essentially axial plane 118 that extends essentially radially, this means that the same plane 118 also is essentially axial and extends essentially radially.

The active part 117 of the respective first seat 108 has a first region 136 situated farthest away from the first end portion 104 of the body 102 in relation to the remaining part of the active part of the first seat 108, wherein the second seat 126 may adjoin the first region 136. More precisely, the at least one first seat surface 116 has a first region 136 situated farthest away from the first end portion 104 of the body 102 in relation to the remaining part or portion of the at least one first seat surface 116, wherein the second seat 126 may adjoin the first region 136 of the at least one first seat surface 116. First region 136 is the region in the first seat 108 that is subjected to the greatest stresses when the cutting insert mounted in the seat machines a workpiece. By placing the second seat 126 adjacent to the first region 136 of the first seat 108, the shim member situated in the second seat 128 protects the most vulnerable region on the body 102. The body 102 may be arranged to receive the shim member 128 in the second seat 126 in such a way that at least a portion 138 of the shim member 128 is situated farthest away from the first end portion 104 of the body 102 in relation to the at least one first seat surface 116.

The device includes first mounting members 140 for the mounting of the cutting insert 112 and second mounting members 142 separated from first mounting members 140 and arranged for the mounting of the shim member 128. The respective mounting members 140, 142 may also be defined as mounting equipment. First mounting members 140 have a first recess 144 arranged in the body 102 and situated at the first seat 108 and that is arranged to receive and hold a first fastening element 146. Second mounting members 142 include a second recess 148 arranged in the body 102 and situated at the second seat 126 and that is arranged to receive and hold a second fastening element 150. The first recess 144 may define a first center axis 152 and the second recess 148 may define a second center axis 154. The first and second recess 144, 148 may be arranged in the body 102 in such a way that the first center axis 152 of the first recess 144 is displaced from the second center axis 154 of the second recess 148. The first and second recess 144, 146 are arranged in the body 102 in such a way that the second center axis 154 is aligned with or parallel to an axis 151 that forms a first angle α with the first center axis 152. The first angle α may be essentially perpendicular. The second recess 148 is arranged in the body 102 in such a way that the second center axis 154 extends essentially radially in relation to the center axis z-z of the body 102. In the first embodiment, the second recess 146 is arranged in the body 102 in such a way that the second center axis 154 of the second recess 148 is aligned with or parallel to an axis that forms an essentially perpendicular angle with the center axis z-z of the body 102.

The second seat 126 has a tangential extension after the at least one first seat surface 116 in relation to the direction of rotation R of the body 102. The body 102 may be arranged to receive a shim member 128 in the second seat 126 in such a way that the shim member 128 has a tangential extension after the at least one first seat surface 116 in relation to the direction of rotation R of the body 102. With reference to FIG. 3, in the second seat 126, the body 102 is arranged to receive a shim member 128 that has a tangential extension in the tangential direction in relation to the center axis z-z of the body 102 and a radial extension in the radial direction in relation to the center axis z-z of the body 102, wherein the length of the tangential extension of the shim member 128 may exceed the length of the radial extension of the shim member 128.

FIGS. 9-14 schematically show a second embodiment of the device for chip removing machining, such as rotary chip removing machining. The device according to the second embodiment may be in the form of a tool, more precisely a milling cutter. The device according to FIGS. 9-14 corresponds largely to the device according to FIGS. 1-8 and therefore certain features of the device according to FIGS. 9-14 corresponding to the features of the device in FIGS. 1-8 are not described in detail for the second embodiment. Also the second embodiment of the device includes a body 202, which defines a center axis z-z. The center axis z-z of the body 202 may also be a rotation axis. The body 202 may be rotatable on its center axis z-z. The body 202 is connectable to a holder or a rotatable spindle. The body 202 has a first end portion 204 and an opposite second end portion 206, wherein the body 202 at the first end portion 204 is connectable to the spindle or the holder. The body 202 includes at least one first seat 208 or a plurality of first seats 208. The respective first seat 208 is arranged for the receipt of a cutting insert 112 and includes an active part 217 having at least one first seat surface 216, which may be located in an essentially axial plane 218 that extends essentially radially in relation to the center axis z-z of the body 202.

Figure 13:
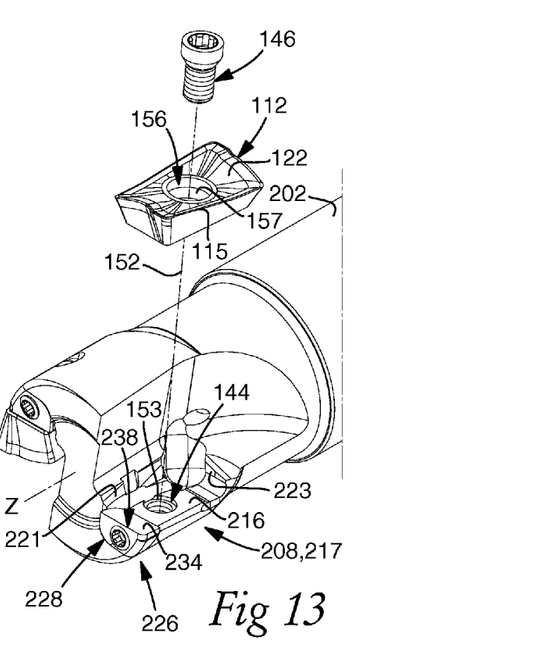
FIG. 13 shows the part of the device in FIG. 12, wherein the cutting insert has been removed from its seat.
Figure 14:
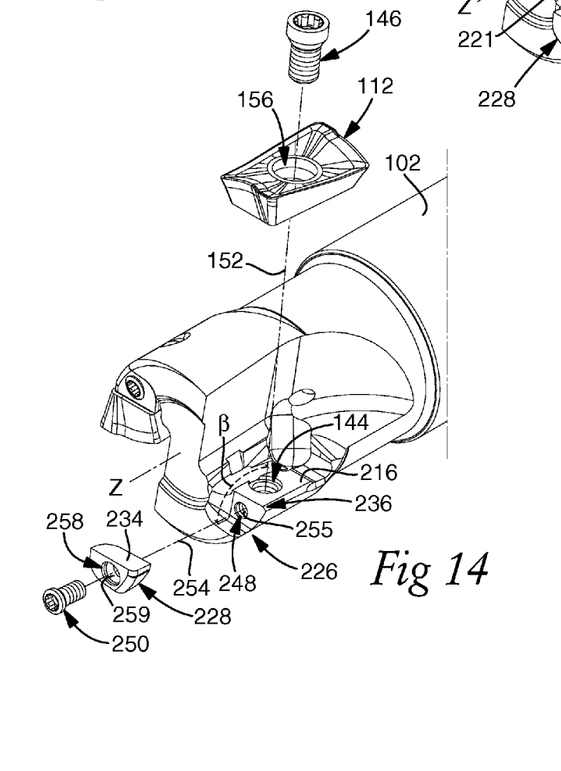
FIG. 14 shows the part of the device in FIG. 12, wherein both the cutting insert and the shim member have been removed from their seats.
Figure 15:
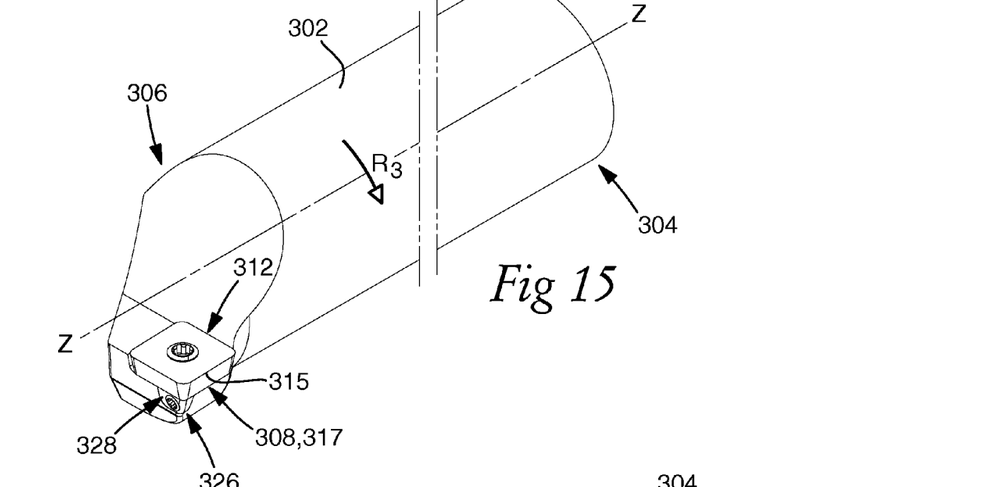
FIG. 15 is a schematic perspective view of a third embodiment of the device.
Figure 16:
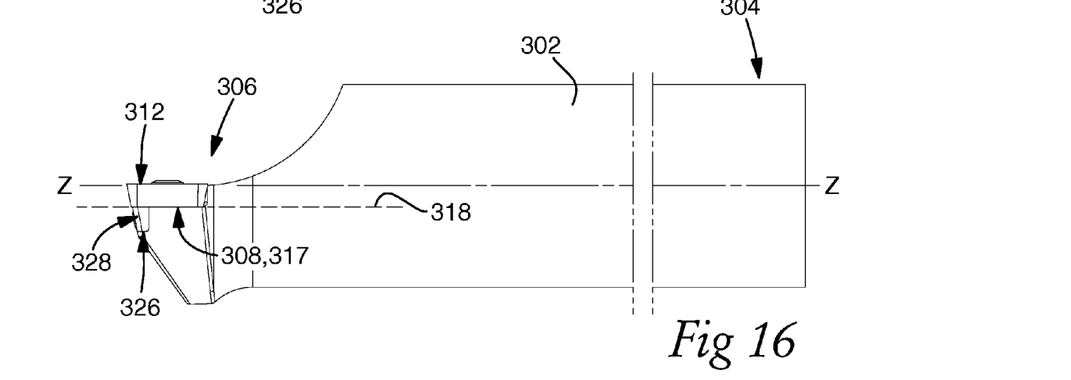
FIG. 16 is a schematic side view of the device in FIG. 15.
Figure 17:
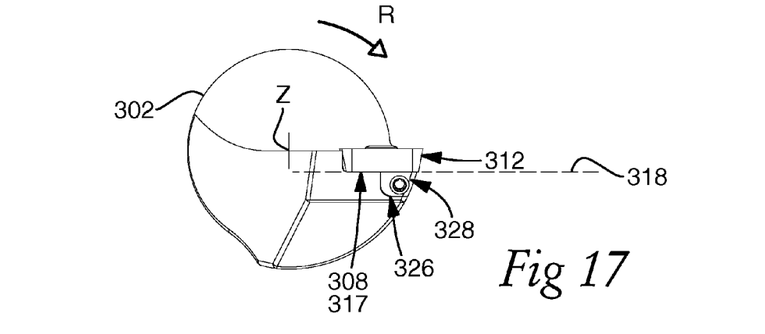
FIG. 17 is a schematic top view of the device in FIG. 15.
Figure 18:
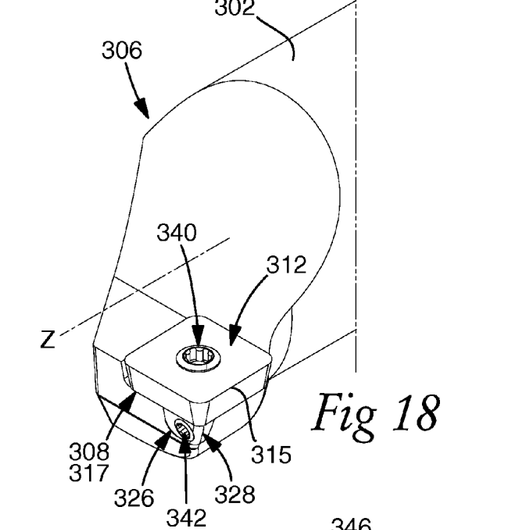
FIG. 18 is an enlargement of a part of the device in FIG. 15.

With reference to FIG. 13, the respective first seat 108 of the second embodiment includes at least one location surface 221, 223 arranged to position the cutting insert 112 axially and radially in the active part 217 of the first seat 208, as described above adjacent to FIG. 5. At the second end portion 206, the body 202 is provided with the at least one first seat 208. The respective first seat 208 may open axially in the direction away from the first end portion 204 of the body 202 in relation to the center axis z-z of the body. The respective first seat 208 may open radially outward from the body 202 in relation to the center axis z-z of the body 202. The body 202 has a second seat 226 arranged for the receipt of a shim member 228, wherein the shim member 228 has at least one contact surface 234. The body 202 includes a second seat 226 for each first seat 208. The second seat 226 may adjoin the first seat 208.

The at least one first seat surface 216 may have a first region 236 situated farthest away from the first end portion 204 of the body 202 in relation to the remaining part or portion of the at least one first seat surface 216, wherein the second seat 226 may adjoin the first region 236 of the at least one first seat surface 216. As mentioned above, the first region 236 is the region of the active part 217 of the first seat 208 that is subjected to the greatest stresses. The body 202 may be arranged to receive the shim member 228 in the second seat 226 in such a way that at least a portion 238 of the shim member 228 is situated farthest away from the first end portion 204 of the body 202 in relation to the at least one first seat surface 216.

The second embodiment of the device includes first mounting members 140 that correspond to said first mounting members 140 of the first embodiment of the device. The second embodiment of the device includes second mounting members 242 separated from said first mounting members 140 and arranged for the mounting of the shim member 228, the design of the second mounting members 226 of the second embodiment differing from the design of the second mounting members 126 of the first embodiment. This also means that the design of the second seat 226 of the second embodiment differs a little from the design of the second seat 126 of the first embodiment.

Second mounting members 242 have a second recess 248 arranged in the body 202 and situated at the second seat 226 and that is arranged to receive and hold a second fastening element 250. The second recess 248 may define a second center axis 254. The first and second recess 144, 248 may be arranged in the body 202 in such a way that the second center axis 254 is aligned with or parallel to an axis that forms a first angle β with the first center axis 152. The first angle fi may be essentially perpendicular. The second recess 248 may be arranged in the body 202 in such a way that the second center axis 254 extends essentially axially in relation to the center axis z-z of the body 202, which is the essential difference to the first embodiment. In the second embodiment, the second recess 246 may be arranged in the body 202 in such a way that the second center axis 254 of the second recess 248 is essentially parallel to the center axis z-z of the body 202.

The second seat 226 may have a tangential extension after the at least one first seat surface 216 in relation to the direction of rotation R of the body 202, wherein the body 202 is arranged to receive a shim member 228 in the second seat 226 in such a way that the shim member 228 has a tangential extension after the at least one first seat surface 216 in relation to the direction of rotation R of the body 202.

The body 202 of the second embodiment is arranged to receive cutting inserts 112 and shim members 228 in a corresponding way as described for the first embodiment in FIGS. 1-8, and therefore this is not described in more detail for the second embodiment.

FIGS. 15-20 schematically show a third embodiment of the device for chip removing machining, such as a rotary chip removing machining. The device according to the third embodiment may be in the form of a tool, more precisely a turning tool. The device includes a body 302, which defines a center axis z-z, the body 302 being connectable to a holder (not shown). The body 302 may be connectable to a holder in ways known to a person skilled in the art. The work piece, which is to be machined, is brought to rotate on the center axis z-z of the body 302 in a direction of rotation $R_3$, also called direction of operational rotation, in relation to the body 302 in a way known to a person skilled in the art. The body 302 has a first end portion 304 and an opposite second end portion 306, wherein the body 302 at the first end portion 304 may be connectable to the holder. The body 302 has at least one first seat 308. The first seat 308 is arranged to receive a cutting insert 312 having at least one main cutting edge 315 arranged to be active during chip removing machining. At the second end portion 304, the body 302 may be provided with the first seat 308. The first seat 308 may open axially in the direction away from the first end portion 304 of the body 302 in relation to the center axis z-z of the body 302. The first seat 308 may open radially outward from the body 302 in relation to the center axis z-z of the body 302.

Figure 19:
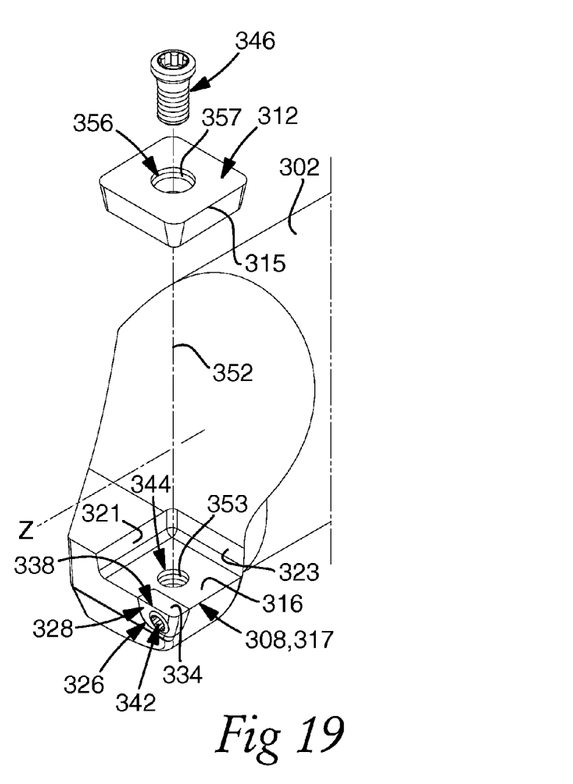
FIG. 19 shows the part of the device in FIG. 18, wherein the cutting insert has been removed from its seat.
Figure 20:
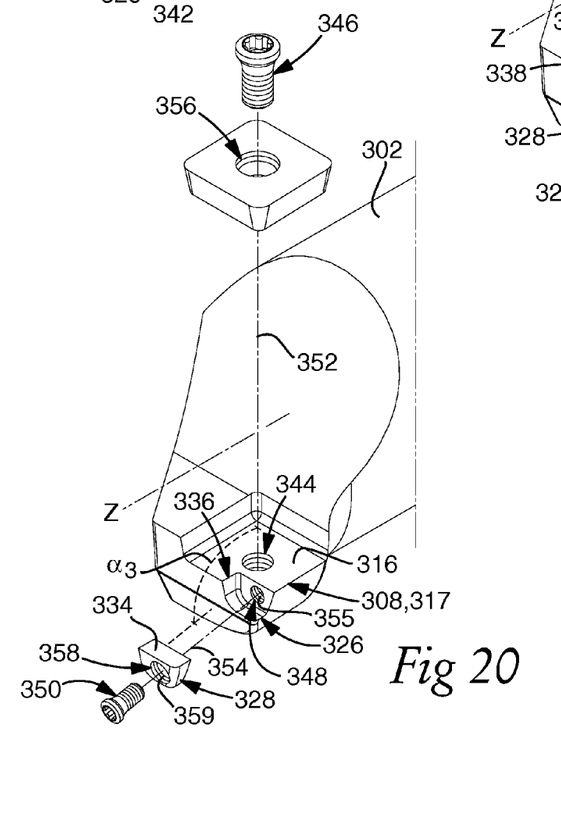
FIG. 20 shows the part of the device in FIG. 18, wherein both the cutting insert and the shim member have been removed from their seats.

With reference to FIGS. 19-20, the first seat 308 includes an active part 317, which in turn includes at least one first seat surface 316. The first seat surface 316 is located in an essentially axial plane 318 that extends essentially radially in relation to the center axis z-z of the body 302. The body 302 is arranged to receive the cutting insert 312 in the first seat 308 against the first seat surface 316. The body 302 is arranged to receive the cutting insert 312 in the first seat 308 in such a way that said active part 317 extends along the active main cutting edge 315 or along a portion thereof.

With reference to FIG. 19, the first seat 308 has at least one location surface 321, 323 arranged to position the cutting insert 312 axially and radially, in relation to the center axis z-z of the body 302, in the active part 317 of the first seat 308. The at least one location surface 321, 323 forms an angle with the first seat surface 316. The at least one location surface 321, 323 includes at least one axially extending location surface 321 and at least one radially extending location surface 323. The active part 317 of the first seat 308 is delimited axially in at least one direction and radially inward by the at least one location surface 121, 123. In the embodiment in FIG. 19, the active part 317 of the first seat 308 is delimited axially in one direction, e.g. in the axial direction toward the first end portion 304 of the body 302, by a radially extending location surface 323. In the embodiment in FIG. 19, the active part 317 of the first seat 308 is delimited radially inward by an axially extending location surface 321.

The body 302 includes a second seat 326 arranged to receive a shim member 328. The body 302 is arranged to receive the shim member 328 in the second seat 326 in such a way that the cutting insert 312 being received in the first seat 308 adjoins the first seat surface 316 and adjoins the shim member 328. The first seat surface 316 has an essentially axial extension and may extend essentially radially in relation to the center axis z-z of the body 302. The second seat 326 may adjoin the first seat 308. The second seat 326 has a pocket 332 arranged in the body 302 and arranged to receive the shim member 328. In the second seat 326, the body 302 may be arranged to receive a shim member 328 having at least one contact surface 334, wherein the body 302 may be arranged to receive the shim member 328 in the second seat 326 in such a way that the cutting insert 312 being received in the first seat 308 adjoins the at least one first seat surface 316 and adjoins the at least one contact surface 334. The body 302 may be arranged to receive the shim member 328 in the second seat 326 in such a way that the at least one contact surface 334 is located in an essentially axial plane 318 that extends essentially radially in relation to the center axis z-z of the body 302. The body 302 may be arranged to receive the shim member 328 in the second seat 326 in such a way that the at least one contact surface 334 has an essentially axial extension and extends essentially radially in relation to the center axis z-z of the body 302. The body 302 may be arranged to receive the shim member 328 in the second seat 326 in such a way that the at least one contact surface 334 and the at least one first seat surface 316 essentially are located in the same plane 318.

The at least one first seat surface 316 has a first region 336 situated farthest away from the first end portion 304 of the body 302 in relation to the remaining part or portion of the at least one first seat surface 316, wherein the second seat 326 adjoins the first region 336 of the at least one first seat surface 316. First region 336 is the region of the active part 317 of the first seat 308 that is subjected to the greatest stresses when the cutting insert is mounted in the seat machines a workpiece. The body 302 may be arranged to receive the shim member 328 in the second seat 326 in such a way that at least a portion 338 of the shim member 328 is situated farthest away from the first end portion 304 of the body 302 in relation to the at least one first seat surface 316.

The device includes first mounting members 340 for the mounting of the cutting insert 312 and second mounting members 342 separated from first mounting members 340 and arranged for the mounting of the shim member 328. First mounting members 340 have a first recess 344 arranged in the body 302 and situated at the first seat 308 that is arranged to receive and hold a first fastening element 346. Second mounting members 342 include a second recess 348 arranged in the body 302 and situated at the second seat 326 that is arranged to receive and hold a second fastening element 350. The first recess 344 defines a first center axis 352 and the second recess 348 defines a second center axis 354. The first and second recess 344, 348 are arranged in the body 302 in such a way that the second center axis 354 is aligned with or parallel to an axis that forms a first angle α3 with the first center axis 352. The first angle α3 may be essentially perpendicular. The second recess 348 is arranged in the body 302 in such a way that the second center axis 354 extends essentially axially in relation to the center axis z-z of the body 302.

Figure 21:
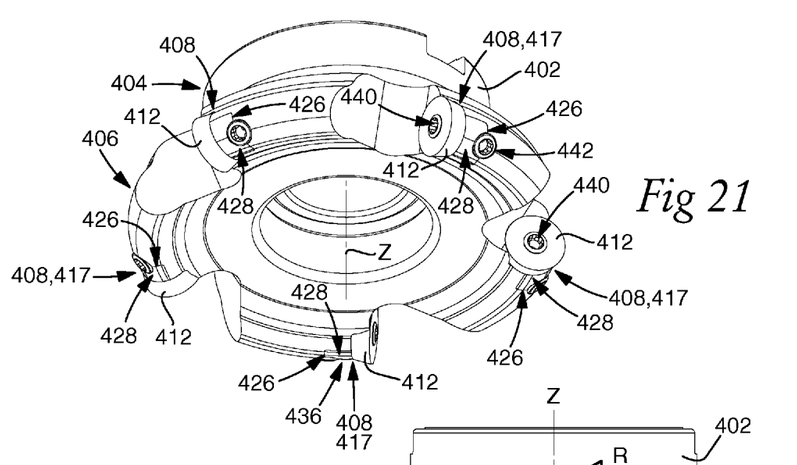
FIG. 21 is a schematic perspective view of a fourth embodiment of the device.
Figures 22, 23:
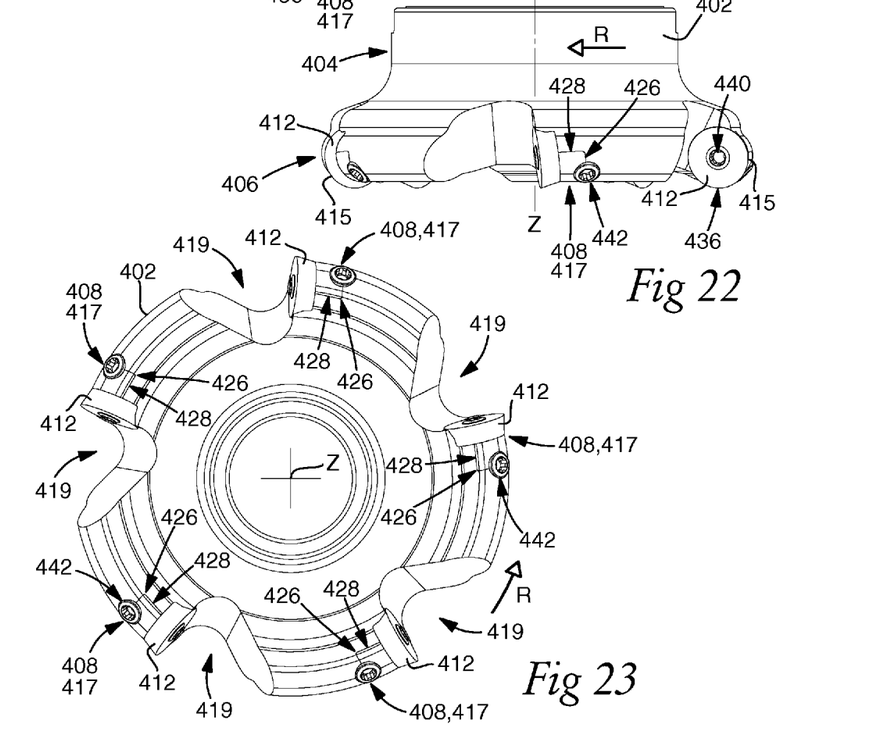
FIG. 22 is a schematic side view of the device in FIG. 21.
FIG. 23 is a schematic top view of the device in FIG. 21.

FIGS. 21-23 schematically show a fourth embodiment of the device for the chip removing machining, such as rotary chip removing machining of a workpiece. The device according to the fourth embodiment may be in the form of a tool, more precisely a milling cutter. The device includes a body 402 defining a center axis z-z. The center axis z-z of the body 402 may also be a rotation axis. The body 402 may be rotatable on its center axis z-z. The body 402 is connectable to a holder or a rotatable spindle (not shown). The body 402 has a first end portion 404 and an opposite second end portion 406, wherein the body 402 at the first end portion 104 may be connectable to the spindle or the holder. The body 402 includes at least one first seat 408 or a plurality of first seats 408, e.g. five first seats 408 as shown in FIGS. 21-23. However, other numbers of first seats are possible. The respective first seat 408 is arranged to receive a cutting insert 412 having at least one main cutting edge 415 arranged to be active during chip removing machining. In this embodiment, the respective cutting insert 412 has a circular shape. At the second end portion 404, the body 402 is provided with the at least one first seat 408. The respective first seat 408 has an active part 417, which in turn has at least one first seat surface in a corresponding way as in the embodiments described above. The respective first seat 408 includes at least one location surface (not shown) arranged to position the cutting insert 412 axially and radially, in relation to the center axis z-z of the body 402, in the active part 417 of the first seat 408. The respective first seat 408 may open axially in the direction away from the first end portion 404 of the body 402 in relation to the center axis z-z of the body 402. The respective first seat 408 may open radially outward from the body 402 in relation to the center axis z-z of the body 402. The respective cutting insert 412 and the respective first seat 408 may adjoin an essentially axially extending chute 419 of the body 402, the respective chute 419 serving as a chip channel upstream of the cutting insert 412. The body 402 may, in relation to a workpiece, be arranged to rotate in a direction of rotation R, also called direction of operational rotation, on its center axis z-z for the respective cutting insert 412 to machine the workpiece.

The body 402 includes a second seat 426 arranged for the receipt of a shim member 428. The body 402 may have a second seat 426 for each first seat 408. The respective first seat 408 has a first region 436 situated farthest away from the first end portion 404 of the body 402 in relation to the remaining part of the first seat 408, wherein the second seat 426 adjoins the first region 436 of the first seat 408. First region 436 is the region in the first seat 408 that is subjected to the greatest stresses when the cutting insert mounted in the seat machines a workpiece.

The device has first mounting members 440 for the mounting of the cutting insert 412 and second mounting members 442 separated from first mounting members 440 and arranged for the mounting of the shim member 428. The first and second mounting members 440, 442 essentially correspond to the mounting members of the embodiments described above.

The body 402 of the fourth embodiment is arranged to receive cutting inserts 412 and shim members 428 in a corresponding way as described for the first embodiment in FIGS. 1-8, and therefore this is not described in more detail for the fourth embodiment.

For all embodiments described above, the respective recess 144, 148; 144, 248; 344, 348 of the first and second recess 144, 148; 144, 248; 344, 348 may be limited by an inner wall 153, 155; 153, 255; 353, 355. The respective recess 144, 148; 144, 248; 344, 348 of the first and second recess 144, 148; 144, 248; 344, 348 may be threaded. The respective fastening element 146, 150; 146, 250; 346, 350 of the first and second fastening element 146, 150; 146, 250; 346, 350 may be threaded. The respective cutting insert 112; 312; 412 may include a through hole 156; 356 arranged to receive the first fastening element 146; 346, wherein the hole 156; 356 of the cutting insert may be included in said first mounting members 140; 340; 440. The respective shim member 128; 228; 328; 428 may include a through hole 158; 258; 358 arranged to receive the second fastening element 150; 250; 350, wherein the shim member hole 158; 258; 358 may be included in said second mounting members 142; 242; 342; 442. The respective through hole 156, 158; 156, 258; 356, 358 may be limited by an inner wall 157, 159; 157, 259; 357, 359. Here, the cross-section of the respective through hole 156, 158; 156, 258; 356, 358 is circular, but other shapes of the respective through hole are possible.

Figure 7:
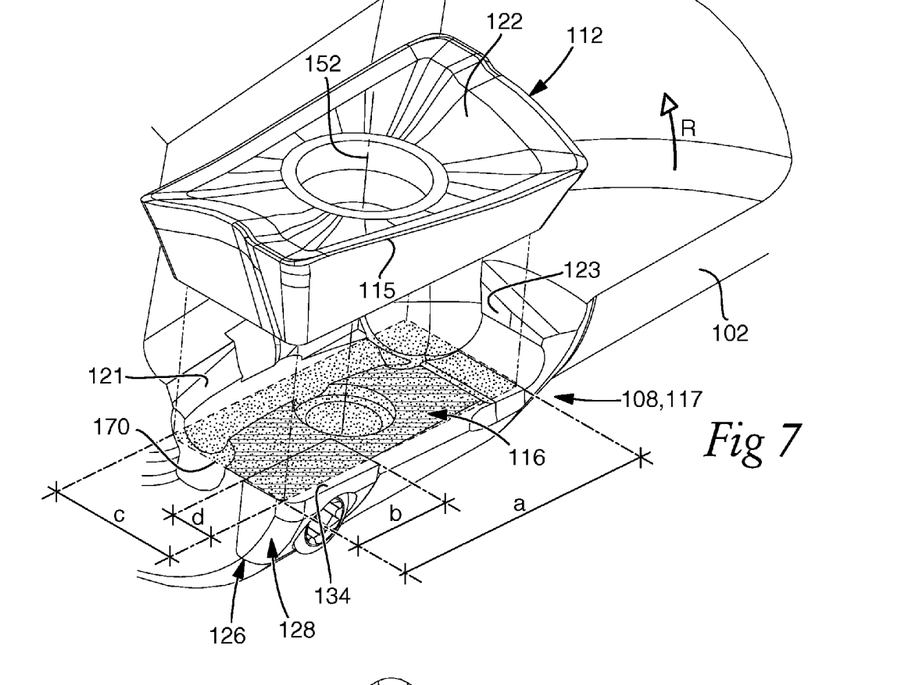
FIG. 7 is an enlarged view of a part of the device in FIG. 1, wherein the cutting insert has been removed from its seat.
Figure 8:
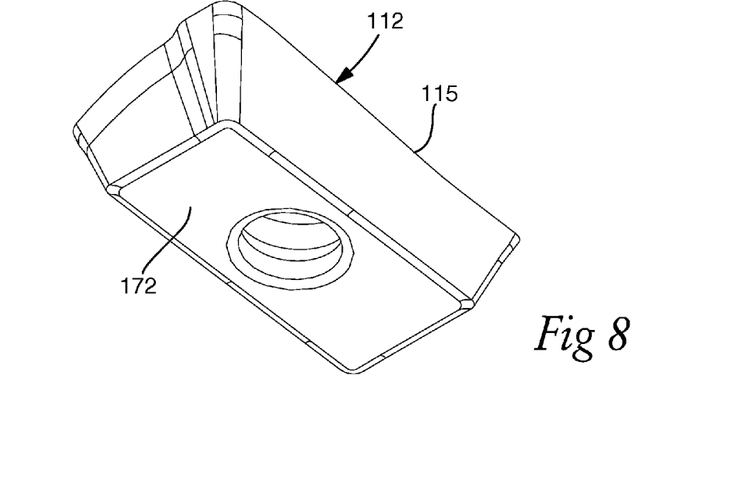
FIG. 8 is a schematic perspective view of the cutting insert in FIG. 7 as seen obliquely from below.
Figure 9:
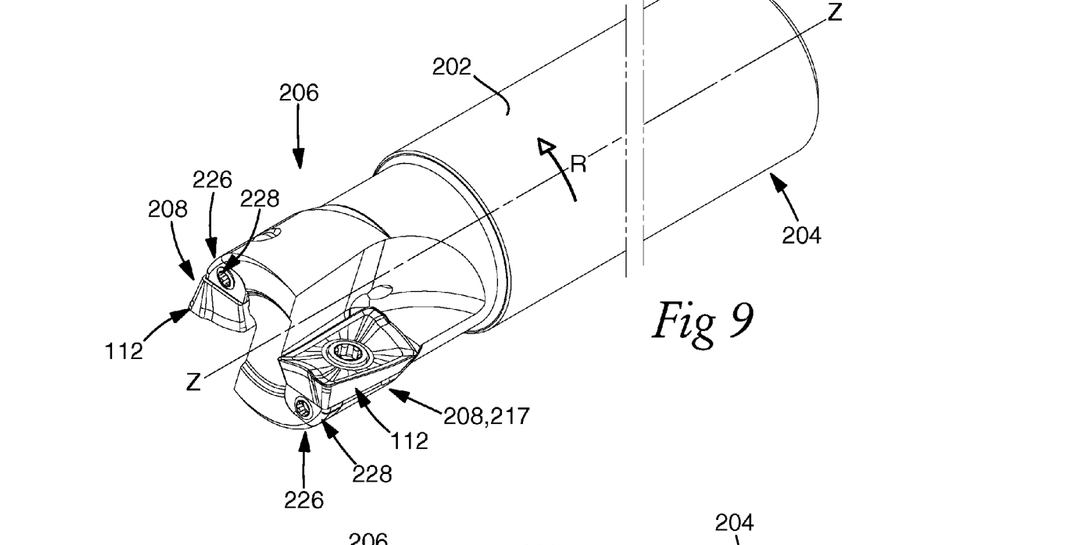
FIG. 9 is a schematic perspective view of a second embodiment of the device.
Figure 10:
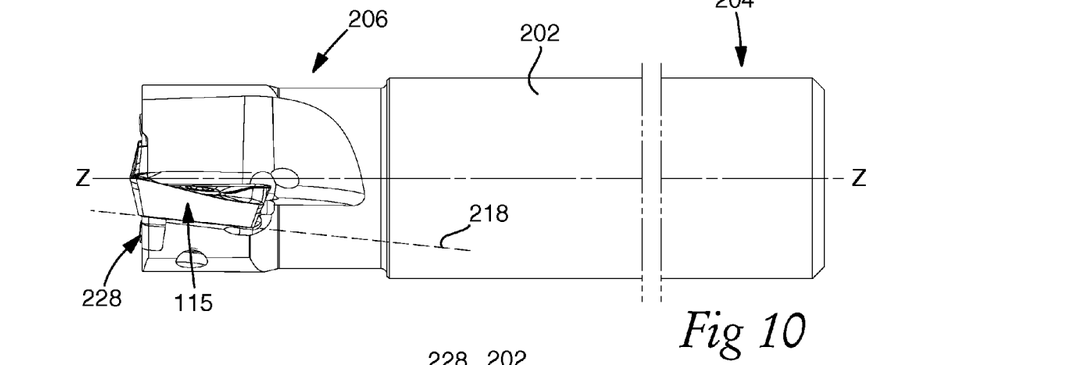
FIG. 10 is a schematic side view of the device in FIG. 9.
Figure 11:
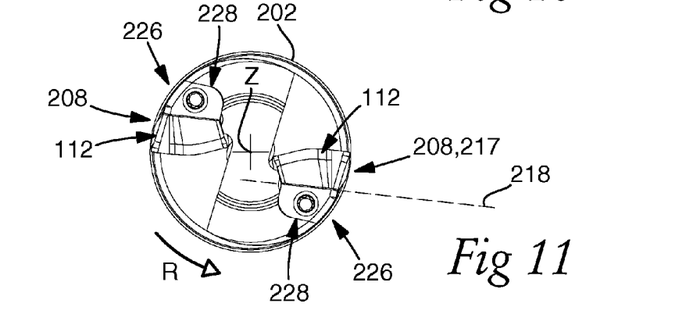
FIG. 11 is a schematic top view of the device in FIG. 9.
Figure 12:
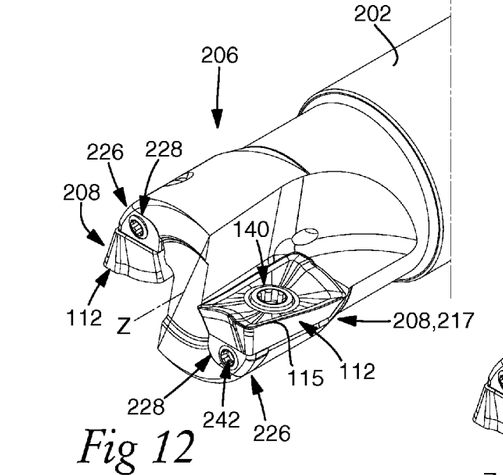
FIG. 12 is an enlargement of a part of the device in FIG. 9.

With reference to FIGS. 7-8, the respective body 102; 202; 302; 402 is arranged to receive the cutting insert 112; 312; 412 in the first seat 108; 208; 308; 408 in such a way that the cutting insert 112; 312; 412, as seen perpendicular to the plane of the at least one first seat surface 116; 216; 316, covers an area 170, the area 170 being defined by the shim member 128; 228; 328; 428 and by the at least one first seat surface 116; 216; 316 of the active part 117; 217; 317; 417. The second seat 126; 226; 326; 426 is arranged to receive a shim member 128; 228; 328; 428 that occupies less than 90% of said area 170, e.g. less than 80% or 70% or 60% or 50% or 40% or 25% of said area 170. The at least one contact surface 134; 234; 334 may be smaller than said area 170, and may, e.g., occupy less than 90% of said area 170, e.g. less than 80% or 70% or 60% or 50% or 40% or 25% of said area 170. In spite of said area 170 and the extension of the shim member 128; 228; 328; 428 being described with reference to the embodiment in FIG. 7, it will be appreciated that the corresponding applies to the rest of the embodiments. In embodiments where the through hole of the shim member, arranged to receive a fastening element, is arranged in the at least one contact surface 134 of the shim member, it will be appreciated that this through hole is part of the share of said area 170 that the shim member occupies.

Area 170 may have an extension a along the active main cutting edge 115; 315; 415 or along a portion thereof. The respective body 102; 202; 302; 402 may be arranged to receive the cutting insert 112; 312; 412 in the first seat 108; 208; 308; 408 and receive the shim member 128; 228; 328; 428 in the second seat 126; 226; 326; 426 in such a way that the shim member 128; 228; 328; 428 at least obtains an extension b along a portion of the active main cutting edge 115; 315; 415. The extension b of the shim member 128; 228; 328; 428 along said portion of the active main cutting edge 115; 315; 415 may be less than the extension a of said area 170 along the active main cutting edge 115; 315; 415 or along a portion thereof. The respective body 102; 202; 302; 402 may be arranged to receive the cutting insert 112; 312; 412 in the first seat 108; 208; 308; 408 and receive the shim member 128; 228; 328; 428 in the second seat 126; 226; 326; 426 in such a way that the extension b of the at least one contact surface 134; 234; 334 along said portion of the active main cutting edge 115; 315; 415 is less than the extension a of said area 170 along the active main cutting edge 115; 315; 415 or along a portion thereof. In spite of said area 170 and the extension of the shim member 128; 228; 328; 428 being described with reference to the embodiment in FIG. 7, it will be appreciated that the corresponding may apply to the rest of the embodiments.

The respective body 102; 202; 302; 402 may be arranged to receive the cutting insert 112; 312; 412 in the first seat 108; 208; 308; 408 and receive the shim member 128; 228; 328; 428 in the second seat 126; 226; 326; 426 in such a way that the extension b of the shim member 128; 228; 328; 428 along the portion of the active main cutting edge 115; 315; 415 occupies less than 90% of the extension a of said area 170 along the active main cutting edge 115; 315; 415 or along a portion thereof, e.g. less than 80% or 70% or 60% or 50% or 40% or 30% of the extension a of said area 170 along the active main cutting edge 115; 315; 415 or along a portion thereof.

The respective body 102; 202; 302; 402 may be arranged to receive the cutting insert 112; 312; 412 in the first seat 108; 208; 308; 408 against the at least one first seat surface 116; 216; 316 in such a way that the active main cutting edge 115; 315; 415 of the cutting insert 112; 312; 412 extends in an essentially axial direction in relation to the center axis z-z of the body 102; 202; 302; 402. The respective body 102; 202; 302; 402 may be arranged to receive the cutting insert in the first seat 108; 208; 308; 408 in such a way that said area 170 has an essentially radial extension c and an essentially axial extension a along the essentially axially extending and active main cutting edge 115; 315; 415 or along a portion thereof. The respective body 102; 202; 302; 402 may be arranged to receive the cutting insert 112; 312; 412 in the first seat 108; 208; 308; 408 and receive the shim member 128; 228; 328; 428 in the second seat 126; 226; 326; 426 in such a way that the shim member 128; 228; 328; 428 at least obtains an essentially axial extension b along a portion of the essentially axially extending and active main cutting edge 115; 315; 415, wherein the essentially axial extension b of the shim member 128; 228; 328; 428 may be less than the essentially axial extension a of said area 170. The respective body 102; 202; 302; 402 may be arranged to receive the cutting insert 112; 312; 412 in the first seat 108; 208; 308; 408 and receive the shim member 128; 228; 328; 428 in the second seat 126; 226; 326; 426 in such a way that the essentially axial extension b of the shim member 128; 228; 328; 428 occupies less than 90% of the essentially axial extension a of said area 170, e.g. less than 80% or 70% or 60% or 50% or 40% or 30% of the essentially axial extension a of said area 170.

With reference to the embodiments in FIGS. 7-8 and FIG. 19, the respective body 102; 302 may be arranged to receive the cutting insert 112; 312 in the first seat 108; 308 and receive the shim member 128; 328 in the second seat 126; 326 in such a way that the shim member 128; 328 at least obtains an essentially radial extension d, wherein the essentially radial extension d of the shim member 128; 328 may be less than the essentially radial extension c of said area 170. The respective body 102; 302 may be arranged to receive the cutting insert 112; 312 in the first seat 108; 308 and receive the shim member 128; 328 in the second seat 126; 326 in such a way that the essentially radial extension d of the shim member 128; 328 occupies less than 90% of the essentially radial extension c of said area 170, e.g. less than 80% or 70% or 60% or 50% or 40% or 30% of the essentially radial extension c of said area 170.

FIG. 8 schematically is the cutting insert 112 in FIG. 7 as seen obliquely from below. The respective cutting insert 112 has a bottom surface 172. The bottom surface 172 of the cutting insert 112 is arranged to abut or adjoin the at least one first seat surface 116 and the shim member 128. The bottom surface 172 of the cutting insert 112 may be the portion of the cutting insert 112 that, as seen perpendicular to the plane of the at least one first seat surface 116; 216; 316, covers area 170 defined by the shim member 128; 228; 328; 428 and by at least one first seat surface 116; 216; 316 of the active part 117.

The respective above described body's 102; 202; 302; 402 center axis z-z may also be defined as the rotation axis of the body. If the center axis z-z of the body 102; 202; 302; 402 is a rotation axis, the body 102; 202; 302; 402 may be arranged to rotate, in relation to the workpiece, in a direction of rotation R on its rotation axis for at least the active main cutting edge 112; 312; 412 to machine the workpiece, wherein the cutting insert 112; 312; 412 may, as seen toward the direction of rotation of the body 102; 202; 302; 402, cover said area 170 defined by the shim member 128; 228; 328; 428 and by the at least one first seat surface 116; 216; 316 of the active part 117; 217; 317; 417.

The respective cutting insert 112; 312; 412 may have at least one main cutting edge 115; 315; 415 and in addition have a minor cutting edge or a plurality of minor cutting edges that adjoin or are adjacent to a main cutting edge 115; 315; 415. In the respective active position, the cutting insert 112; 312; 412 may have a main cutting edge 115; 315; 415 that extends in an essentially axial direction and a minor cutting edge that extends in an essentially radial direction from the only end of the main cutting edge 115; 315; 415. In the chip removing machining, both the main cutting edge 115; 315; 415 and the minor cutting edge may engage the workpiece, but it is the main cutting edge 115; 315; 415 that is the primary active cutting edge of the cutting insert 112; 312; 412 and is responsible for the major part of the chip removing machining.

The main cutting edge 115; 315; 415 that is active during machining, i.e., the working or active main cutting edge, is the main cutting edge 115; 315; 415 that machines the workpiece. The respective cutting insert 112; 312; 412 may be provided with a plurality of main cutting edges and may be indexable into a plurality of different active positions. Often, only one main cutting edge is active, while the rest of main cutting edges are inactive and do not machine the workpiece. The respective cutting insert may, e.g., be provided with two main cutting edges and is accordingly indexable into two different active positions, or be provided with four main cutting edges and is accordingly indexable into four different active positions. The respective cutting insert may also be provided with only one main cutting edge or with another number of main cutting edges.

The respective device may include the shim member 128; 228; 328; 428 received in the second seat 126; 226; 326; 426. The respective device may have the cutting insert 112; 312; 412 received in the first seat 108; 208; 308; 408. The respective shim member 128; 228; 328; 428 may be detachably mounted to the body 102; 202; 302; 402 in the second seat 126; 226; 326. The respective cutting insert 112; 312; 412 may be detachably mounted to the body 102; 202; 302; 402 in the first seat 108; 208; 308; 408. The respective seat may also be called the cutting seat or pocket.

The respective shim member may be manufactured from a first material composition while the body may be manufactured from a second material composition, which differs from the first material composition. The respective body may, e.g., be manufactured from a material composition that is softer than the material composition of the respective shim member. The respective shim member may, e.g., be manufactured from a cemented carbide, while the respective body may be manufactured from steel. Other materials or material compositions are, however, possible. The respective cutting insert may be manufactured from a third material composition, which differs from the first material composition, and may also differ from the second material composition. The first material composition may be more ductile than the third material composition. The respective body or shim member may be manufactured from a material composition that is softer than the material composition of the respective cutting insert. The respective cutting insert may, e.g., be manufactured from a cemented carbide, e.g. with coating, such as ceramics. Other materials or material compositions are, however, possible.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

What is claimed is:

1. A device for the chip removing machining of a work piece, the device comprising
a body connectable to a holder or a rotatable spindle, the body defining a center axis and including at least one first seat that receives a cutting insert having at least one main cutting edge active during chip removing machining, the first seat having at least one first seat surface, the body receiving the cutting insert in the first seat against the at least one first seat surface, the first seat having at least one location surface, the at least one location surface forming an angle with the first seat surface and being arranged to position the cutting insert axially and radially in the first seat, wherein the body receives the cutting insert in the first seat such that said at least one first seat surface extends along the active main cutting edge or along a portion thereof, the body including a second seat arranged to receive a shim member, wherein the body receives the shim member in the second seat such that the cutting insert being received in the first seat abuts against the at least one first seat surface and the shim member, wherein said at least one first seat surface is delimited axially in at least one direction and radially inward, in relation to the center axis, by the at least one location surface, the body receiving the cutting insert in the first seat such that the cutting insert, as seen perpendicular to a plane of the at least one first seat surface, covers an area defined by the shim member and by the at least one first seat surface, and in that the second seat is arranged to receive a shim member that occupies less than 90% of said area, the body including first mounting members for the mounting of the cutting insert and second mounting members separated from said first mounting members and arranged for mounting of the shim member, wherein said first mounting members include a first recess arranged in the body and situated at the first seat to receive and hold a first fastening element, wherein said second mounting members include a second recess arranged in the body and situated at the second seat to receive and hold a second fastening element, the first recess defining a first center axis and the second recess defining a second center axis, the first and second recess being arranged in the body such that the second center axis is aligned with or parallel to an axis that forms a first angle with the first center axis.

2. A device according to claim 1, wherein the second seat is arranged to receive a shim member that occupies less than 80% of said area.

3. A device according to claim 1, wherein the body includes a first end portion and an opposite second end portion, the body at the first end portion being connectable to the spindle or the holder and at the second end portion being provided with the first and second seat, the first seat having a first region spaced at a distance from the first end portion of the body greater than any other part of the first seat, wherein the second seat is located adjacent said first region.

4. A device according to claim 3, wherein the body is arranged to receive the shim member in the second seat such that at least a portion of the shim member is situated farthest away from the first end portion of the body in relation to the at least one first seat surface.

5. A device according to claim 1, wherein the at least one first seat surface is located in an essentially axial plane that extends essentially radially in relation to the center axis of the body.

6. A device according to claim 1, wherein in the second seat the body is arranged to receive a shim member including at least one contact surface, the body being arranged to receive the shim member in the second seat such that the cutting insert being received in the first seat adjoins the at least one first seat surface and adjoins the at least one contact surface, and in that the at least one contact surface is smaller than said area.

7. A device according to claim 1, wherein the first angle is essentially perpendicular.

8. A device according to claim 1, wherein the second recess is arranged in the body such that the second center axis extends essentially radially in relation to the center axis of the body.

9. A device according to claim 1, wherein the second recess is arranged in the body such that the second center axis extends essentially axially in relation to the center axis of the body.

10. A device according to claim 1, wherein in the second seat, the body is arranged to receive a shim member that has a tangential extension in the tangential direction in relation to the center axis of the body and a radial extension in the radial direction in relation to the center axis of the body, the length of the tangential extension of the shim member exceeding the length of the radial extension of the shim member.

11. A device according to claim 1, wherein the shim member is received in the second seat.

12. A device according to claim 1, wherein the cutting insert is received in the first seat.

13. A device according to claim 1, wherein the shim member is manufactured from a first material composition and the body is manufactured from a second material composition, which differs from the first material composition.

14. A device according to claim 1, wherein the shim member is manufactured from a first material composition and the cutting insert is manufactured from a second material composition, which differs from the first material composition.

* * * * *